United States Patent
Syed

(10) Patent No.: US 10,868,877 B2
(45) Date of Patent: *Dec. 15, 2020

(54) SINGLE INTERFACE FOR ACTIVATING IOT DEVICES TO NETWORK DATA PLANS

(71) Applicant: T-Mobile USA, Inc., Bellevue, WA (US)

(72) Inventor: Hamza Syed, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/862,552

(22) Filed: Apr. 29, 2020

(65) Prior Publication Data

US 2020/0260276 A1   Aug. 13, 2020

Related U.S. Application Data

(63) Continuation of application No. 15/184,986, filed on Jun. 16, 2016, now Pat. No. 10,674,357.

(51) Int. Cl.
| | |
|---|---|
| *H04L 29/08* | (2006.01) |
| *G06F 3/0484* | (2013.01) |
| *H04W 8/18* | (2009.01) |
| *H04W 12/06* | (2009.01) |
| *H04W 12/08* | (2009.01) |
| *H04W 12/12* | (2009.01) |

(52) U.S. Cl.
CPC .............. *H04L 67/16* (2013.01); *H04L 67/34* (2013.01); *H04W 8/18* (2013.01); *H04W 8/183* (2013.01); *H04W 8/186* (2013.01); *H04W 12/06* (2013.01); *H04W 12/0608* (2019.01); *H04W 12/08* (2013.01); *H04W 12/0804* (2019.01); *H04W 12/1206* (2019.01); *H04W 12/12* (2013.01)

(58) Field of Classification Search
CPC ......... H04W 12/06; H04W 4/70; H04W 4/50; H04W 8/183; H04W 12/0023; H04W 4/60; H04W 84/042; H04W 8/005; H04W 12/08; H04W 4/38; H04W 76/19
See application file for complete search history.

(56) References Cited

U.S. PATENT DOCUMENTS

| | | | |
|---|---|---|---|
| 10,674,357 B2* | 6/2020 | Syed | H04W 8/183 |
| 2014/0095336 A1 | 4/2014 | Raulerson et al. | |
| 2015/0181419 A1 | 6/2015 | Mistry et al. | |
| 2015/0185713 A1 | 7/2015 | Glickfield et al. | |
| 2015/0205991 A1 | 7/2015 | Park et al. | |
| 2015/0288681 A1 | 10/2015 | Park et al. | |

(Continued)

OTHER PUBLICATIONS

U.S. Appl. No 15/184,986 (issued as U.S. Pat. No. 10,674,357), filed Jun. 16, 2016; titled Single Interface for Activating IOT Devices to Network Data Plans.

*Primary Examiner* — Gary Lafontant
(74) *Attorney, Agent, or Firm* — Perkins Coie LLP

(57) ABSTRACT

Systems and methods are described herein for activating internet of things (IoT) devices, and other non-carrier provided devices, to data and other communication plans associated with a subscriber of a telecommunications carrier. The systems and methods may generate and publish a single API that, when called by an IoT device (e.g., an associated activation client for the IoT device) receives information associated with the IoT device and activates the IoT device to the subscriber's plan.

20 Claims, 6 Drawing Sheets

(56) References Cited

U.S. PATENT DOCUMENTS

| | | |
|---|---|---|
| 2015/0324181 A1 | 11/2015 | Segal |
| 2016/0065653 A1 | 3/2016 | Chen et al. |
| 2017/0171187 A1 | 6/2017 | Yin et al. |
| 2017/0332430 A1 | 11/2017 | Ponnuswamy |

* cited by examiner

SINGLE INTERFACE FOR ACTIVATING IOT DEVICES TO NETWORK DATA PLANS

CROSS-REFERENCES TO RELATED APPLICATIONS

This application is a continuation of U.S. patent application Ser. No. 15/184,986, filed on Jun. 16, 2016 the disclosure of which is hereby incorporated herein in its entirety by reference.

BACKGROUND

Typically, when a subscriber of a cell phone plan wishes to add a device (e.g., a tablet) to his/her current plan, the subscriber visits a retail store associated with a carrier providing the cell phone plan for the subscriber. At the retail store, which may be, for example, a carrier-specific store or a big box store, the subscriber may meet with a customer representative to select a specific device, select one or more eligible calling and/or data plans, and activate the device (e.g., add a line for the device) to the subscriber's current plan. However, the typical scenario may suffer from a variety of drawbacks, such as when a subscriber wishes to add devices not provided by the carrier, among other things.

BRIEF DESCRIPTION OF THE DRAWINGS

Embodiments of the disclosed technology will be described and explained through the use of the accompanying drawings.

Figure 1:
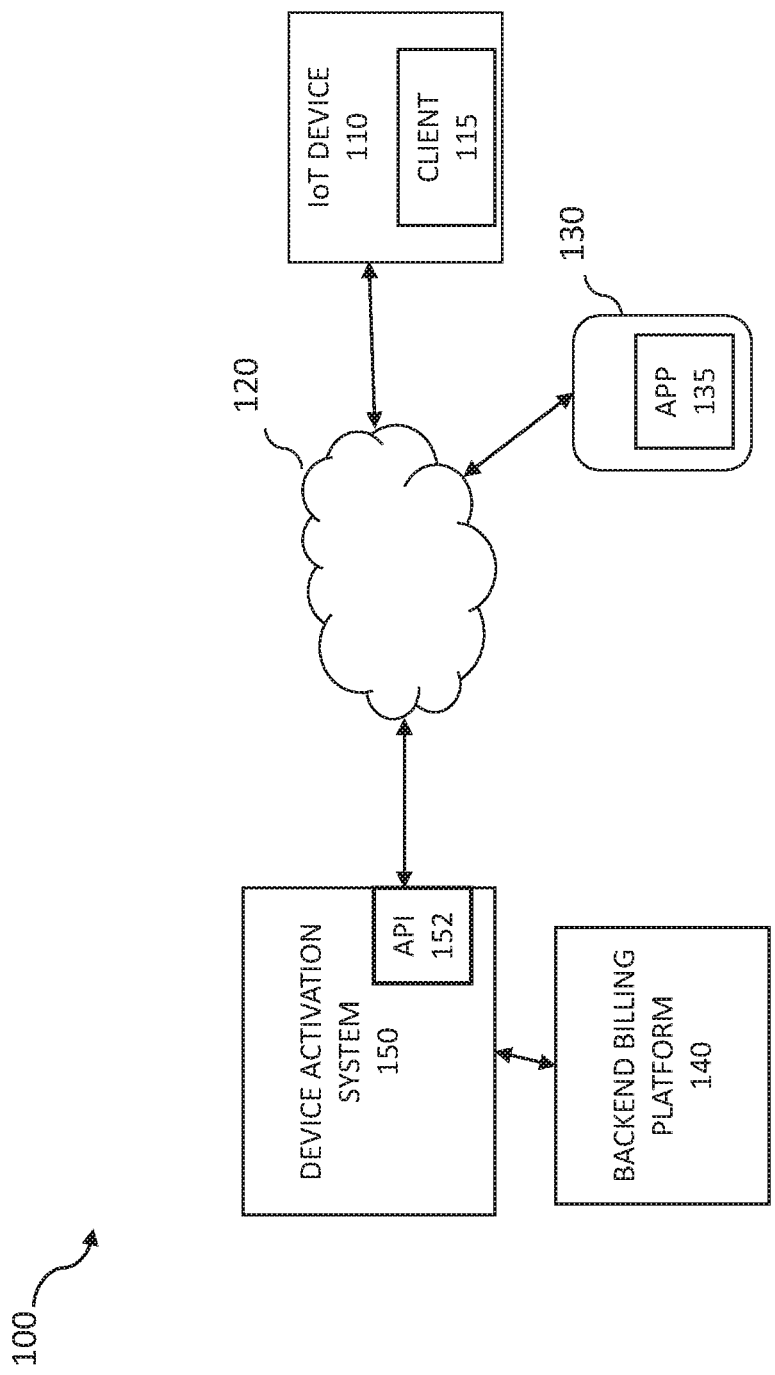
FIG. 1 is a block diagram illustrating a suitable computing environment within which to provide a single interface for activating internet of things (IoT) devices to network data plans.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for activating internet of things (IoT) devices, and other non-carrier provided devices, to data and other communication plans associated with a subscriber of a telecommunications carrier. The systems and methods may generate and publish a single API that, when called by an IoT device (e.g., an associated activation client for the IoT device) receives information associated with the IoT device and activates the IoT device to the subscriber's plan.

For example, the systems and methods may publish an application programming interface (API) configured to receive identification information from an IoT device that calls the API, determine whether a user associated with the IoT device is a subscriber of a network carrier that provides the telecommunications plan to subscribers of the network carrier, and activate the IoT device to receive telecommunications services via the telecommunications plan provided by the network carrier when the user associated with the IoT device is confirmed as a subscriber of the network carrier.

In order to call an API associated with a network carrier, the IoT device (e.g., a car or wearable device) may include or be associated with an activation client or interface that receives input from a user of the IoT device to activate the IoT device to a data plan associated with the user and provided by a network carrier, obtain an International Mobile Station Equipment Identity (IMEI) identifier and a subscriber identity module (SIM) identifier from the IoT device, and call the API using the obtained identifiers. In response to calling the API, the IoT device may receive communications directly from the network carrier's subscriber management system, such as by receiving activation information associated with activating the IoT device to the data plan associated with the user. The client may then activate the IoT device to receive and transmit data over a telecommunications network provided by the network carrier.

The systems and methods, therefore, provide a single, uniform API to one or more IoT devices, enabling the IoT devices to provide subscriber or device identity information directly to the telecommunications carrier's billing and subscriber management systems in order to be activated to data and other communications plans provided by the carrier. Via the API and clients running on the IoT devices, the systems and methods enable subscribers to activate in runtime their IoT devices to their current plans, without involving customer care representatives or retail store personnel.

Various embodiments of the system will now be described. The following description provides specific details for a thorough understanding and an enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Computing Environments

FIG. 1 is a block diagram illustrating a suitable computing environment 100 within which to provide an interface for activating internet of things (IoT) devices, and other non-carrier provided devices, to data and other communication plans associated with a subscriber of a telecommunications carrier.

The "Internet of Things" is a network of devices, such as vehicles, buildings, wearable devices, appliances, and so on, that communicate with one another, collect data, exchange data, and so on. In order to provide such functionality, an IoT device 110 may be embedded with electronics, software, sensors, and network connectivity components (e.g., Wi-Fi antennas, SIM cards, and so on). A user may be associated with or own a variety of different IoT devices 110, such as vehicles (e.g., automobiles, bicycles, boats, motorcycles, and so on), wearable devices (e.g. smart watches, smart glasses, and so on), GPS devices, home appliances and other home devices, and so on.

The IoT device 110 communicates with other devices and systems via a network 120, such as the Internet or long term evolution (LTE) telecommunications network. For example, the IoT device 110 may communicate with a mobile device 130 associated with a subscriber of telecommunication services provided by a network carrier associated with the network 120. The IoT device 110 may transmit and receive data (e.g., content, communications, and so on) over the network 120 with any other devices or systems that access the network 120. The mobile device 130 may be a smart phone, tablet computer, and so on, and may include one or more mobile applications 130.

The network carrier may manage services provided to subscribers of the network 120 via a backend billing system or platform 140 or other subscriber management systems. As described herein, the network carrier may provide a device activation system 150 that is configured to directly communicate with IoT devices 110 to activate the IoT devices to the network 120.

In some embodiments, the mobile device 130, the lot device 110, and/or the device activation system 150 may include network communication components that enable the devices to communicate with one another, remote servers, and/or other portable electronic devices by transmitting and receiving wireless signals using a licensed, semi-licensed, or unlicensed spectrum over communications network, such as network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 may also include third-party communications networks such as a Global System for Mobile (GSM) mobile communications network, a code/ time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.☐

As described herein, the device activation system 150, in some embodiments, may generate and publish an application programming interface (API) 152 that, when called by the IoT device 110. The IoT device 110 may include or be associated with an activation client 115, which provides information to the API 152 and receives information associated with the IoT device 110 from the API 152. The activation client 115 also activates the IoT device 110 to the subscriber's plan based on the information received from the API 152. Further details regarding the activation client 115 and the device activation system 150, including the API 152, will be disclosed herein.☐

FIG. 1 and the discussion herein provide a brief, general description of a suitable computing environment 100 in which the device activation system 150 can be supported and implemented. Although not required, aspects of the device activation system 150 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Examples of Activating IoT Devices to Subscriber Network Communications Plans

As described herein, in some embodiments, the systems and methods provide a framework for customers of IoT devices 110, such as vehicles, to directly interface with the backend billing and management system 140 of a network carrier in order to add their IoT devices to their data and other communications plans.

Figure 2:
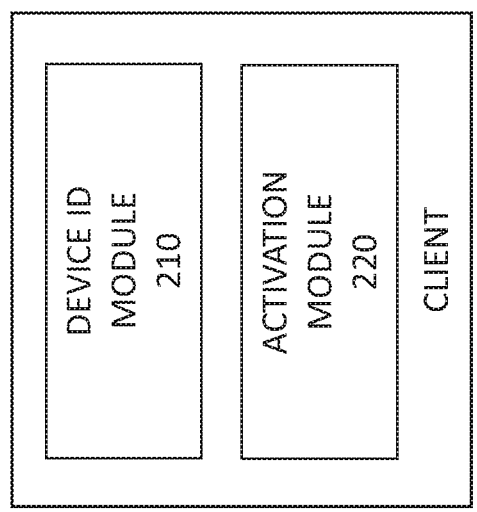
FIG. 2 is a block diagram illustrating the components of an activation client contained by an IoT device.

FIG. 2 is a block diagram illustrating the components of the activation client 115 associated with the IoT device 110. The activation client 115, which may act as a service interface for one or more devices (e.g., connected cars, smart watches, smart appliances, and so on), includes functional modules that are implemented with a combination of software (e.g., executable instructions, or computer code) and hardware (e.g., at least a memory and processor). In some cases, the activation client 115 is contained by and/or part of the IoT device 110. In other cases, the activation client 115 may be provided along with the IoT device 110, such as via the mobile device 130, via an associated computing system (e.g., at a computing system of a car dealership), and so on.

Accordingly, as used herein, in some examples a module is a processor-implemented module or set of code and represents a computing device having a processor that is at least temporarily configured and/or programmed by executable instructions stored in memory to perform one or more of the particular functions that are described herein. For example, the activation client 115 may include a device identification (ID) module 210 and an activation module 220.

In some embodiments, the device ID module 210 is configured and/or programmed to obtain an International Mobile Station Equipment Identity (IMEI) identifier and a subscriber identity module (SIM) identifier from the IoT device. For example, the device ID module 210 may query one or more device APIs to obtain the IMEI number for the IoT device 110, and one or more SIM APIs or settings databases of the device 110 to obtain the SIM number (or, ICCID) associated with the SIM card.

In some embodiments, the activation module 220 calls the application programming interface (API) 152 associated with provisioning data communication services to the IoT device 110 via a data plan associated with the user. In response to receiving activation information from the API 152 that is associated with activating the IoT device 110 to the data plan associated with the user, the activation module 220 activates the IoT device 110 to receive and transmit data over the network provided by the network carrier. For example, the activation module 220 may transmit the obtained IMEI and SIM information, along with other identification information (e.g., subscriber account credentials) to the API 152, which authorizes the subscriber and the activation of the IoT device to the subscriber's plan. The activation module 220 receives information representative of the authorization (e.g., an approval code or other data), and uses the data to activate the IoT device 110.

Figure 3:
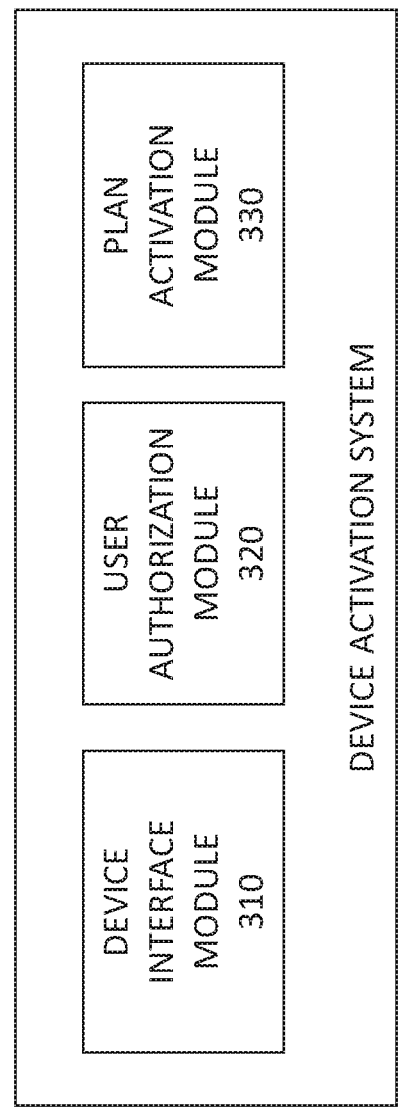
FIG. 3 is a block diagram illustrating the components of a device activation system.

FIG. 3 is a block diagram illustrating the components of the device activation system 150. The device activation system 150 includes functional modules that are implemented with a combination of software (e.g., executable instructions, or computer code) and hardware (e.g., at least a memory and processor). For example, the device activation system 150 may include a device interface module 310, a user authorization module 320, and a plan activation module 330.

In some embodiments, the device interface module 310 is configured and/or programmed to generate, create, and/or publish an application programming interface (API) configured to receive an International Mobile Station Equipment Identity (IMEI) identifier and a subscriber identity module (SIM) identifier from an IoT device that calls the API. For example, the device interface module 310 may publish the API 152, which is associated with the billing subscriber system 140 of a network carrier that provides the telecommunications plan to subscribers of the network carrier.

In some cases, the API 152 is a REST web service API configured to be called by the IoT device, such as a REST API that is configured to facilitate direct communications between the activation client 115 associated with the IoT device 110 and the backend subscriber billing system 140 provided by the network carrier.

In some embodiments, the user authorization module 320 is configured and/or programmed to determine whether a user associated with the IoT device 110 is a subscriber of the network carrier. For example, the user authorization module 320 may receive credential information from the user of the IoT device 110, query one or more subscriber databases within the billing system 140 to determine whether the user is a subscriber of one or more data plans, and authorize the user associated with the IoT device as the subscriber of the network carrier based on the requested credential information.

The user authorization module 320 may also determine whether the IoT device 110 is stolen or unauthorized to be associated with the user by querying various databases that identify stolen vehicles, objects, and so on. For example, the API 152 may receive a vehicle identification number (VIN) or other identifiers along with the IMEI and SIM information from the activation client 115 of a connected vehicle, and utilize the VIN number when performing queries to determine whether the vehicle is stolen or unauthorized.

In some embodiments, the plan activation module 330 is configured and/or programmed to activate the IoT device 110 to receive telecommunications services via the telecommunications plan provided by the network carrier when the user authorization module 320 authorizes the user associated with the IoT device 110 as a subscriber of the network carrier.

For example, the plan activation module 330 may identify one or more data services plans of which the IoT device 110 is eligible, transmit, via the API 152, to the IoT device 110 information representative of the identified one or more data services plans, and receive, via the API 152, information associated with a selection of one of the one or more data services plans by the user of the IoT device. The module may then activate the IoT device 110 to the subscriber's plan by updating the billing system 140 to add the IoT device as a "line" or additional device receiving data and other services via the network carrier.

Furthermore, the plan activation module 330 may perform other functions when activating data and other service plans for IoT devices. For example, the module 330 may facilitate the IoT device 110 to view and interact with account information associated with the plan, may facilitate the purchase of additional data passes or plan upgrades by IoT devices 110, and so on.

Figure 4:
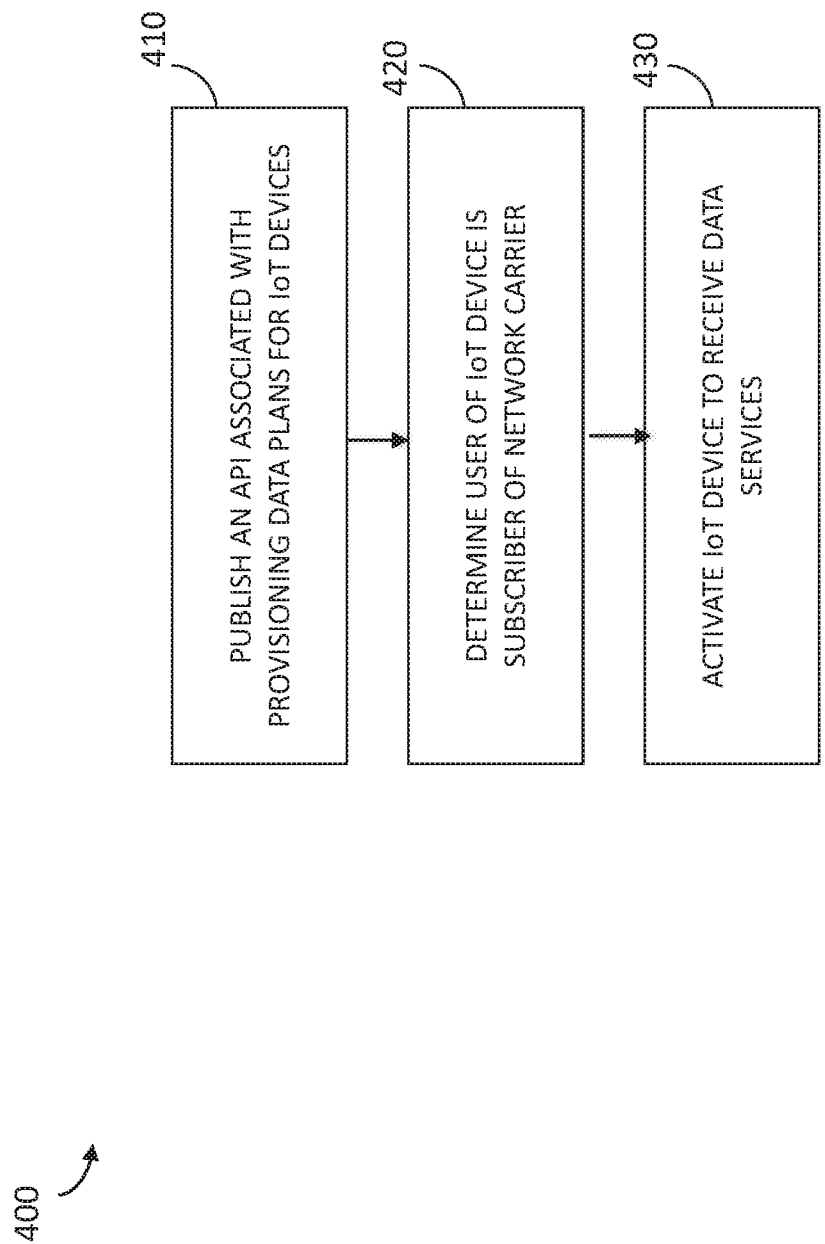
FIG. 4 is a flow diagram illustrating a method for activating an IoT device to a data plan.

As described herein, the device activation system 150 performs various processes or operations in order to provision, in run-time, IoT devices to network carrier communication services plans, such as data plans. FIG. 4 is a flow diagram illustrating a method 400 for activating an IoT device to a subscriber's telecommunications plan. The method 400 may be performed by the device activation system 150 and, accordingly, is described herein merely by way of reference thereto. It will be appreciated that the method 400 may be performed on any suitable hardware.

In operation 410, the system 150 publishes an application programming interface (API) configured to receive identification information from an IoT device that calls the API, where the API is associated with the subscriber system 140 of a network carrier that provides the telecommunications plan to subscribers of the network carrier. For example, the device interface module 310 may publish a REST web service API configured to be called by the IoT device 110, such as a REST API that is configured to facilitate direct communications between the activation client 115 associated with the IoT device 110 and the backend subscriber billing system 140 provided by the network carrier. The REST API may be configured to receive International Mobile Station Equipment Identity (IMEI) identifiers and subscriber identity module (SIM) identifiers from IoT devices that call the API.

In operation 420, the system 150 determines whether a user associated with the IoT device is a subscriber of the network carrier. For example, the user authorization module 320 may receive credential information from the user of the IoT device 110, query one or more subscriber databases within the billing system 140 to determine whether the user is a subscriber of one or more data plans, and authorize the user associated with the IoT device as the subscriber of the network carrier based on the requested credential information.

In operation 430, the system 150 activates the IoT device to receive telecommunications services via the telecommunications plan provided by the network carrier when the user associated with the IoT device is confirmed as a subscriber of the network carrier. For example, the plan activation module 330 may identify one or more data services plans of which the IoT device 110 is eligible, transmit, via the API 152, to the IoT device 110 information representative of the identified one or more data services plans, and receive, via the API 152, information associated with a selection of one of the one or more data services plans by the user of the IoT device. The module may then activate the IoT device 110 to the subscriber's plan by updating the billing system 140 to add the IoT device as a "line" or additional device receiving data and other services via the network carrier.

Figure 5:
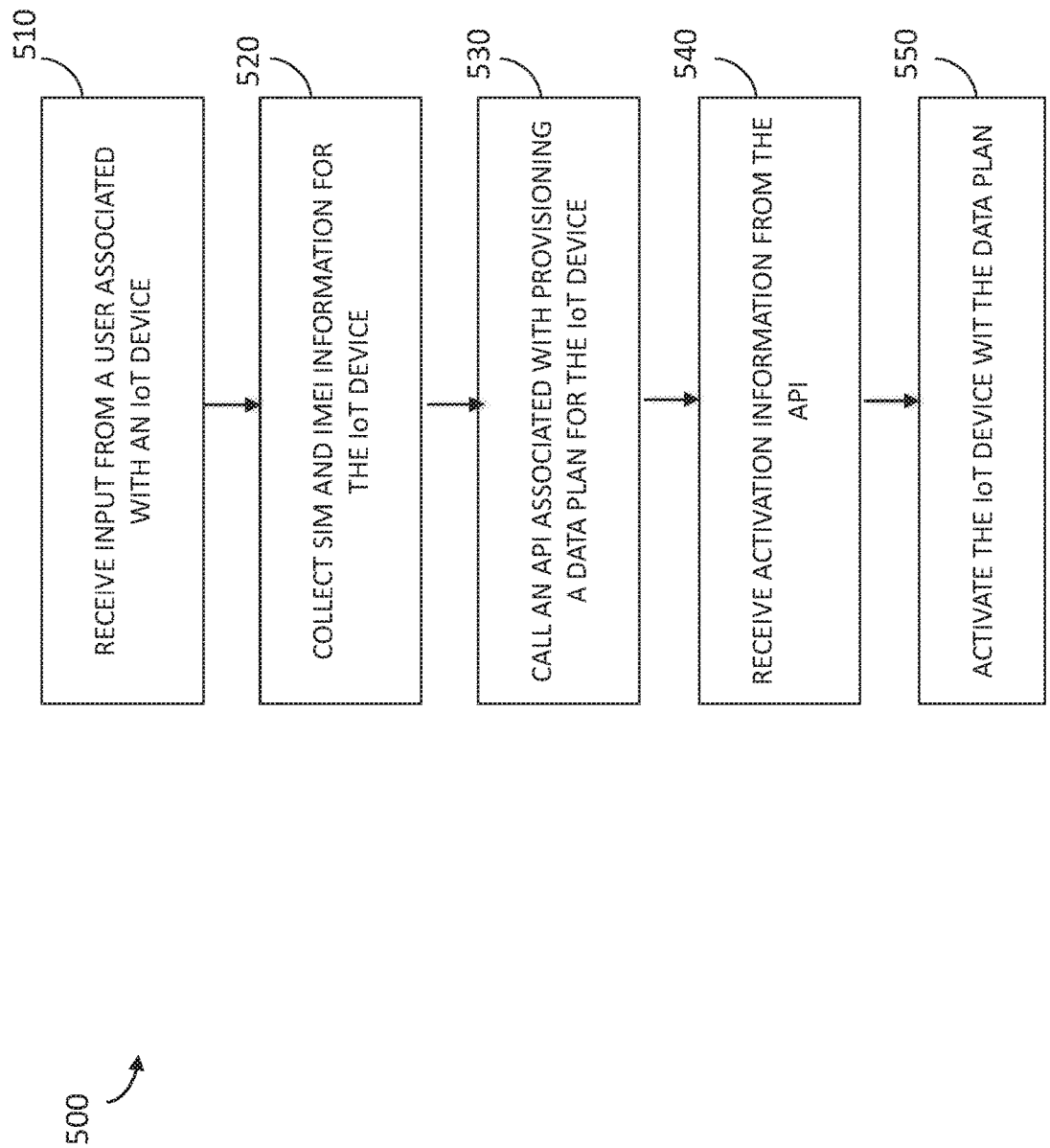
FIG. 5 is a flow diagram illustrating a method for providing information associated with an IoT device to an application programming interface (API) associated with a carrier's subscriber system.

As described herein, the activation client 115 of the IoT device 110 may perform operations to provision the IoT device 110 to a subscriber's data plan. FIG. 5 is a flow diagram illustrating a method 500 for providing information associated with an IoT device to an application programming interface (API) associated with a carrier's subscriber system. The method 500 may be performed by the activation client 115 and, accordingly, is described herein merely by way of reference thereto. It will be appreciated that the method 500 may be performed on any suitable hardware.

In operation 510, the client 115 receives input from a user of the IoT device to activate the IoT device to a data plan associated with the user and provided by a network carrier, wherein the data plan associated with the user is configured to provide data communications services over a network provided by the network carrier to a mobile device associated with the user. For example, the client 115 may receive a request from a user via a user interface of the IoT device 110 to add the IoT device 110 to his/her cell phone plan.

In operation 520, the client 115 obtains an International Mobile Station Equipment Identity (IMEI) identifier and a subscriber identity module (SIM) identifier from the IoT device 110. For example, the device ID module 210 may query one or more device APIs to obtain the IMEI number for the IoT device 110, and one or more SIM APIs or settings databases of the device 110 to obtain the SIM number (or, ICCID) associated with the SIM card.

In operation 530, the client 115 calls an application programming interface (API) associated with provisioning data communication services to the IoT device via the data plan associated with the user. In response to calling the API, the client 115, in operation 540, receives activation information associated with activating the IoT device 110 to the data plan associated with the user. In operation 550, the client 115 activates the IoT device 110 to receive and transmit data over the network provided by the network carrier.

For example, the activation module 220 may transmit the obtained IMEI and SIM information, along with other identification information (e.g., subscriber account credentials) to the API 152, which authorizes the subscriber and the activation of the IoT device to the subscriber's plan. The activation module 220 receives information representative of the authorization (e.g., an approval code or other data), and uses the data to activate the IoT device 110.

Figure 6:
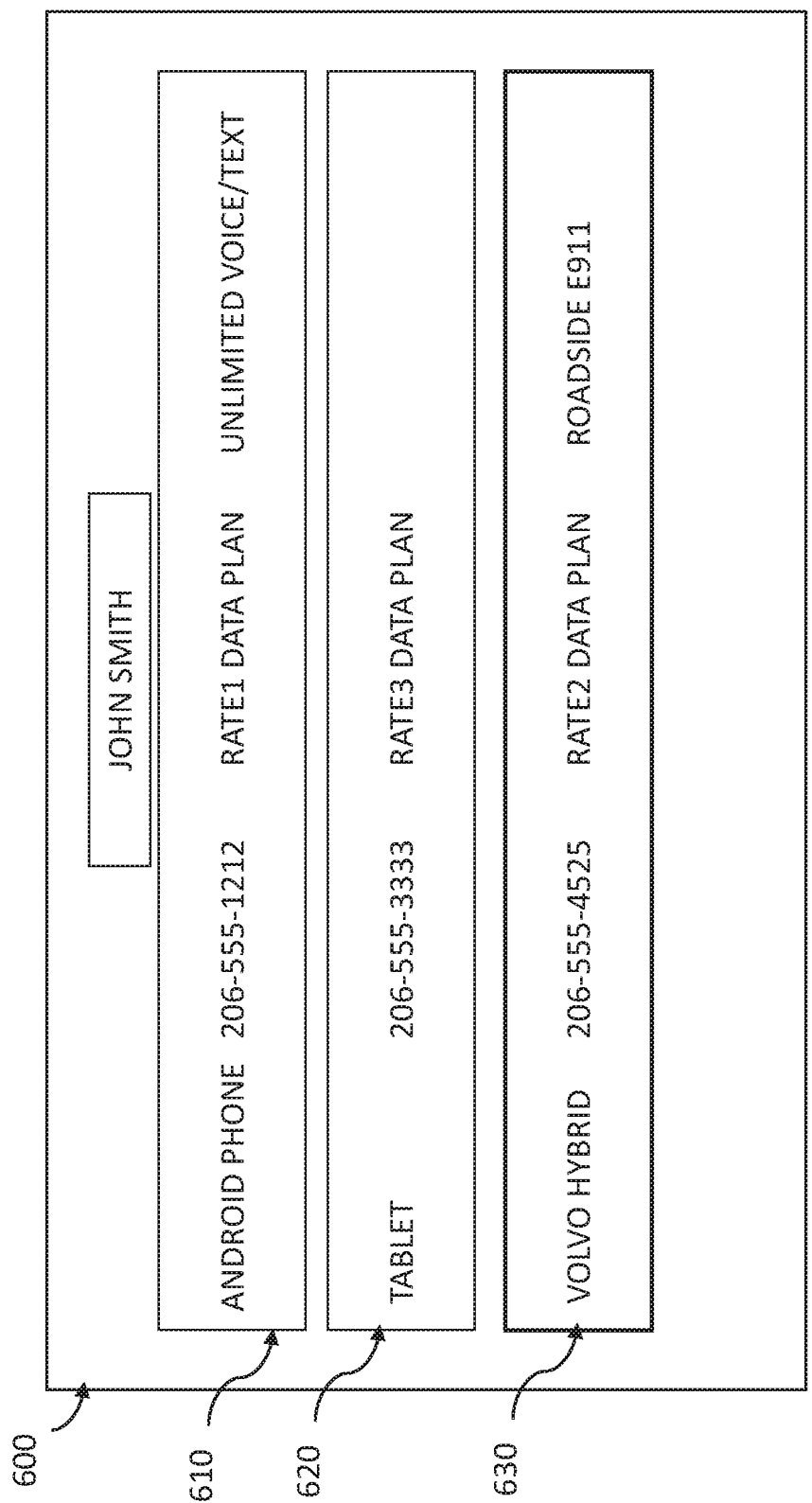
FIG. 6 is a display diagram illustrating an example user interface presenting information associated with various devices activated to a subscriber's network plan.

For example, FIG. 6 is a display diagram illustrating an example user interface 600 presenting information associated with various devices activated to a subscriber's network plan. As depicted, the user interface 600 includes various entries for devices and their associated details within the subscriber's plan. A first entry 610, representing a first "line" of the plan, represents the user's smart phone. A second entry 620, representing a second "line" of the plan, represents the user's tablet computer. And, a third entry 630, representing a third "line" of the plan provisioned to the plan using the methods described herein, represents the user's connected car. As shown, the connected car is provisioned with a number, a data plan, services specific to the car, and so on.

Thus, in some embodiments, the systems and methods described herein enable users of IoT devices to quickly and directly add new devices, such as IoT devices not provided by a network carrier, to their data services plans provided by the network carrier. By providing an API configured to receive device-specific information and interact with subscriber systems to authorize and activate devices to subscriber plans, the network carrier may reduce or remove barriers associated with user's attempting to add new lines of service to their plans for their IoT devices, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

I claim:

1. A method for associating an IoT device to a data plan provided to a user of the IoT device, the method comprising;
   receiving input to associate the IoT device with a data plan provided by a wireless network carrier,
      wherein the data plan is configured to provide data communications services over a wireless network provided by the wireless network carrier;
   obtaining at least one unique identifier from the IoT device;
   employing an application programming interface (API) associated with provisioning data communication services to the IoT device via the data plan,
      wherein employing the API includes transmitting the at least one unique identifier, and
      wherein the API is associated with a backend subscriber billing system of the wireless network carrier that provides the data plan;
   in response to employing the API, receiving activation information associated with the IoT device to the data plan; and
   permitting the IoT device to receive data, transmit data, or both receive and transmit data over the wireless network provided by the wireless network carrier.

2. The method of claim 1, wherein the at least one unique identifier includes an International Mobile Station Equipment Identity (IMEI) identifier and a subscriber identity module (SIM) identifier.

3. The method of claim 1, further comprising determining whether a user associated with the IoT device is a subscriber of the wireless network carrier, including:

requesting credential information from the user of the IoT device; and
   authorizing the user associated with the IoT device as the subscriber of the wireless network carrier based on the requested credential information.

4. The method of claim 1, further comprising activating the IoT device to receive telecommunications services via the data plan, including:
   identifying one or more data services plans of which the IoT device is eligible;
   transmitting, via the API and to the IoT device, information representative of the identified one or more data services plans; and
   receiving, via the API, information associated with a selection of one of the one or more data services plans by the user of the IoT device.

5. The method of claim 1, wherein the API is a rest web service API configured to be called by the IoT device.

6. The method of claim 1, wherein the API is a web service API configured to facilitate direct communications between an activation client associated with the IoT device and the backend subscriber billing system provided by the wireless network carrier.

7. At least one non-transitory computer-readable storage medium whose contents, when executed by a client associated with an internet of things (IoT) device, cause the client to perform a process for activating the IoT device to a data plan associated with a user of the IoT device, comprising:
   receiving input to associate the IoT device with a data plan provided by a wireless network carrier,
      wherein the data plan is configured to provide data communications services over a wireless network provided by the wireless network carrier;
   obtaining at least one unique identifier from the IoT device;
   employing an application programming interface (API) associated with provisioning data communication services to the IoT device via the data plan,
      wherein employing the API includes transmitting the at least one unique identifier, and
      wherein the API is associated with a backend subscriber billing system of the wireless network carrier that provides the data plan;
   in response to employing the API, receiving activation information associated with the IoT device to the data plan; and
   permitting the IoT device to receive data, transmit data, or both receive and transmit data over the wireless network provided by the wireless network carrier.

8. The computer-readable medium of claim 7, wherein the IoT device is for use in a vehicle, and wherein permitting the IoT device to receive data, transmit data, or both receive and transmit data includes activating the vehicle to utilize a connected car data plan provided by the network carrier.

9. The computer-readable medium of claim 7, wherein the client is contained by the IoT device.

10. The computer-readable medium of claim 7, wherein the client is part of a computing system provided by a vendor of the IoT device.

11. An internet of things (IoT) device to be associated with a telecommunications plan provided by a network carrier associated with a telecommunications network, the device comprising:

at least one environmental sensor configured to produce sensor data;

communications module configured to communicate with the telecommunications network and provide the sensor data to the telecommunications network;

at least one memory; and at least one hardware data processor coupled to the environmental sensor, the communications module and the memory, wherein the data processor is configured to execute software modules stored in the memory, including:

an IoT device interface module that employs an application programming interface (API) configured to provide an International Mobile Station Equipment Identity (IMEI) identifier, a subscriber identity module (SIM) identifier, or both the IMEI identifier and the SIM identifier from the IoT device via the API, wherein the API is associated with a subscriber system of the network carrier that provides the telecommunications plan to subscribers of the network carrier, and wherein the API is associated with a backend subscriber billing system of the wireless network carrier that provides the telecommunications plan for the IoT device;

an activation module that activates the IoT device to receive telecommunications services via the telecommunications plan provided by the network carrier when the network carrier authorizes a user associated with the IoT device as a subscriber of the network carrier.

12. The IoT device of claim 11, further comprising a user authorization module that:

requests credential information from the user of the IoT device; and authorizes the user associated with the IoT device as the subscriber of the network carrier based on the requested credential information.

13. The IoT device of claim 11 wherein the activation module:

identifies one or more data services plans of which the IoT device is eligible;

transmits, via the API, to the IoT device information representative of the identified one or more data services plans; and receives, via the API, information associated with a selection of one of the one or more data services plans by the user of the IoT device.

14. The IoT device of claim 11, wherein the IoT device interface module publishes a rest web service API configured to be called by the IoT device.

15. The IoT device of claim 11, wherein the IoT device interface module publishes a rest web service API configured to facilitate direct communications between the activation module associated with the IoT device and the backend subscriber billing system provided by the network carrier.

16. The IoT device of claim 11, further comprising a user authorization module configured to determine whether the IoT device is stolen or unauthorized to be associated with the user.

17. The IoT device of claim 11, wherein the IoT device is configured to be installed in a vehicle.

18. The IoT device of claim 11, wherein the IoT device is a wearable device.

19. The IoT device of claim 11, wherein the IoT device is a home appliance located at a residence of the user.

20. The IoT device of claim 11, wherein the IoT device is for installation in an automobile, and the data processor is configured to:

determine whether the automobile is stolen or unauthorized to be associated with the user before activating the IoT device to receive telecommunications services via the telecommunications plan provided by the network carrier.

* * * * *